United States Patent [19]
Walter

[11] Patent Number: 4,924,157
[45] Date of Patent: May 8, 1990

[54] MOTORIZED VIDEO PROJECTION SCREEN CONTROL WITH DIGITAL INTERFACE

[76] Inventor: Arthur P. Walter, 216 Tremont Ave., S. Plainfield, N.J. 07080

[21] Appl. No.: 305,100

[22] Filed: Feb. 2, 1989

[51] Int. Cl.⁵ .......................... H02P 1/22; H02J 1/00
[52] U.S. Cl. .................................... 318/265; 318/266; 307/112
[58] Field of Search ................. 307/112, 38, 113, 132, 307/149; 200/5 A, 5 R, 6 A; 318/265, 266

[56] References Cited
U.S. PATENT DOCUMENTS

| | | | |
|---|---|---|---|
| 4,005,387 | 1/1977 | Herring et al. | 364/200 |
| 4,092,574 | 5/1978 | Hansen et al. | 318/265 |
| 4,482,850 | 11/1984 | Sonoda et al. | 318/265 X |
| 4,549,233 | 10/1985 | Teranishi et al. | 318/265 X |

Primary Examiner—William M. Shoop, Jr.
Assistant Examiner—Sharon D. Logan

[57] ABSTRACT

A device for controlling a motorized video projection screen, which allows for remote to the screen adjustability for repeatable positioning of the viewing surface, with the ability to interface, via digital logic, with any device capable of sinking enough current at 5 volts to hold the logic lines in the low state; most notably by computer interface cards.

2 Claims, 1 Drawing Sheet

MOTORIZED VIDEO PROJECTION SCREEN CONTROL WITH DIGITAL INTERFACE

CROSS REFERENCES

None.

BACKGROUND OF THE INVENTION

1. Field of the Invention

The invention relates generally to a device for controlling the extension and retraction of a motorized video projection screen. Repeatable positions are allowed which are adjustable along the full length of screen travel between its two mechanical limit switches.

2. Description of the Prior Art

Motorized projection screens currently in manufacture employ mechanical limit switches to achieve repeatable extended and retracted positions. These limit switches provide only one extended position and full retraction and are adjustable only at the screen itself which may be mounted in an inaccessable place. This device allows control of the screen by: two remotely adjustable repeatable timers, actuated by pushbuttons, one for extension and one for retraction; a toggle switch for full manual control to any position; and a digital logic interface for positioning the screen by means of commercially available computer output boards through software control to any position.

SUMMARY OF THE INVENTION

This invention will allow more flexible utilization of the motorized projection screen with the many types of video projection devices of our day. This is particularly true with video cassette recorders and computer driven systems where it may be desirable to view both the full screen length and also only a precise section of the screen. The latter case would allow the bottom lines of the projected image to be hidden from public view by falling below the bottom of the screen. These lower lines could then be used for sending commands to the computer, or device projecting the image on the screen, to control that image.

Projection screens are not the only product which this device can control. The device has application wherever a product needs an accurate and repeatable source of 120 Volt AC power to accomplish its task; whether by adjustable timers, manual control or through the digital logic interface via computers and similar devices. The size of the 120 Volt AC load would be limited by the ratings of THY1–THY2 (FIG. 1). The duration the power is applied would be determined by R1 and C1 or R2 and C2 (FIG. 1), the actuation of the manual switch SW3 (FIG. 1), or the input to the digital logic interface at connector J2 (FIG. 1).

BRIEF DESCRIPTION OF THE DRAWING

The schematic shown in FIG. 1 is the symbolic electronic description of this device. Included in the circuit are an interlock device U4, to lockout unwanted combinations of the other inputs, an adjustable dual timer U3, to provide a remote to the screen adjustable travel period, and a three input NOR gate U5, to allow output triac drivers U1 and U2 to be triggered from: the adjustable timers through SW1 and SW2, the manual switch SW3, or the digital logic interface at J2 via computer boards, etc.. All three methods drive U6 and U7, which, through LED1 and LED2, provide lighted indication of the direction the screen is traveling. An associated power supply and component resistors and capacitors are included to provide proper timing and logic levels for operation of the device.

DESCRIPTION OF THE PREFERRED EMBODIMENTS

Figure 1:
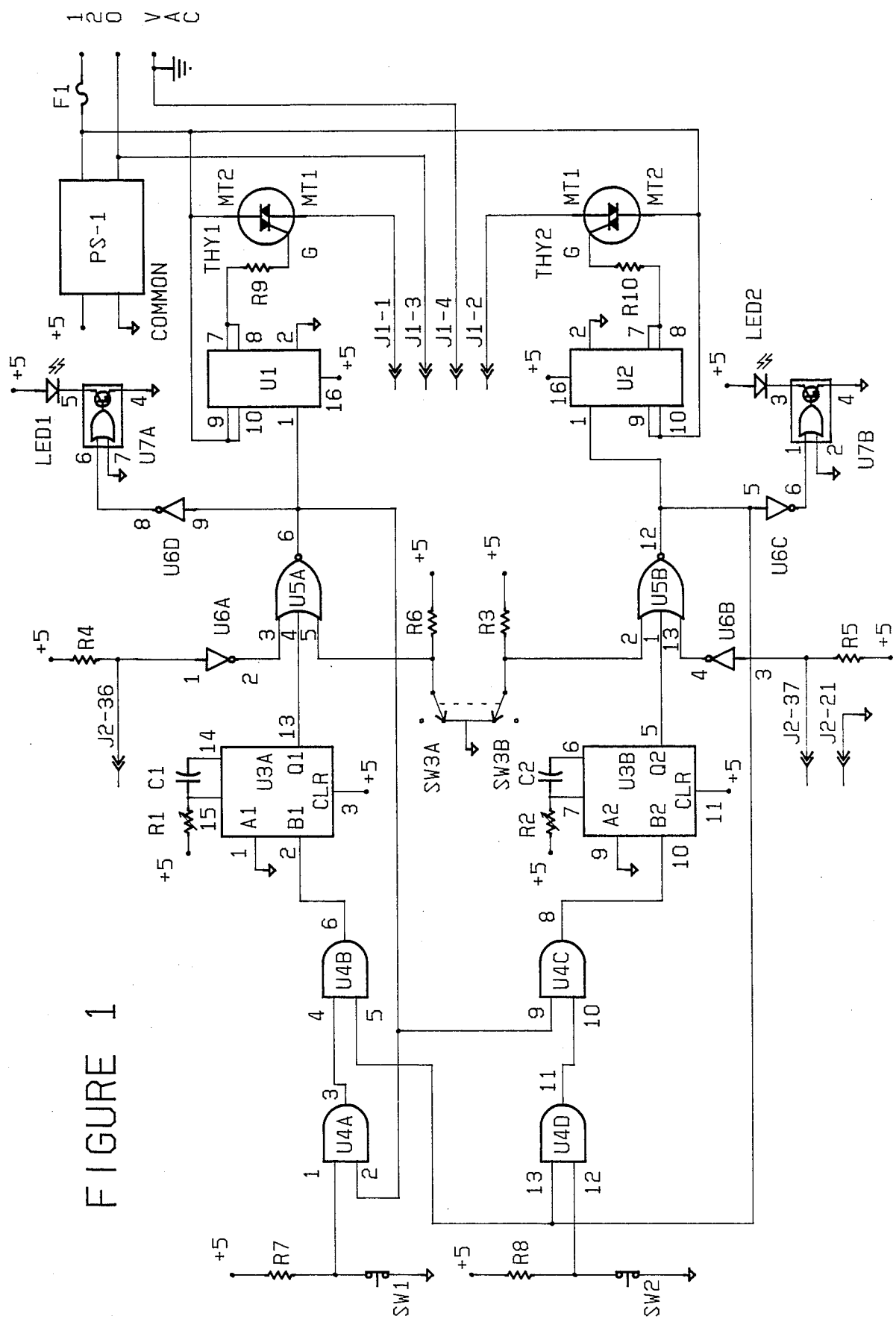

The circuit in FIG. 1 is composed of two sections. One section, identified below as the UP section, processes inputs from SW1, SW3A, and J2 pins 36 and 21 (J2-36 and J2-21). A level change at any one of these inputs will cause the voltage at J1 pin 1 (J1-1) to rise from zero to 120 Volts AC which can be used to drive the motorized screen UP into its case. The other section, identified below as the DOWN section, processes inputs from SW2, SW3B, and J2 pins 37 and 21 (J2-37 and J2-21). A level change at any one of these inputs will cause the voltage at J1 pin 2 (J1-2) to rise from zero to 120 Volts AC which can be used to drive the motorized screen DOWN out of its case for viewing.

When 120 VAC power is applied to the circuit in FIG. 1, 5 volts DC is developed by PS-1 and is applied to each place as shown by the +5. The +5 volt and common connections to power the individual logic devices are assumed, and not shown for clarity.

THE UP SECTION

SW1 is the "up" pushbutton switch, and it controls the voltage level at connector J1 pins 1 and 3 (J1-1 and J1-3) in the following manner. When SW1 is actuated, the voltage at pin 1 of U4, a QUADRUPLE TWO INPUT AND GATE, changes from low (near zero volts) to high (near +5 volts) due to R7. As long as pin 2 of U4 is also high, which it will be if no other input is calling for an action from the UP section of U5, a TRIPLE THREE INPUT NOR GATE, a high level is also generated at pins 3 and 4 of U4. As long as pin 5 of U4 is also high, which it will be as long as there has been no level change at pins 2, 1 or 13 of U5 requesting an action from the DOWN circuit, a high level is also generated at pin 6 of U4 and pin 2 of U3. U3 is a DUAL NON-RETRIGGERABLE MONOSTABLE ONE SHOT device, configured with its "A1" input (pin 1) held low and its "CLEAR" input (pin 3) held high. In the quiescent state U3's "Q1" output is low. A rising voltage level on its "B1" input (pin 2) will cause its "Q1" output (pin 13) to change state for the time period set by the values of R1 and C1. A maximum period of 70 seconds is allowed by this device. When pin 13 of U3 goes high, pin 4 of U5 also goes high causing pin 6 of U5 to go low, locking out any action of SW2 by holding pin 9 of U4 low. When pin 6 of U5 goes low, pin 1 of U1, a DC CONTROLLED SOLID STATE AC RELAY, also goes low, triggering TRIAC THY1 "on" through R9; and the voltage level at J1-1 goes from zero to 120 Volts AC for the time period set by R1 and C1. When pin 6 of U5 goes low, pin 9 of U6, a HEX INVERTER BUFFER, also goes low causing its output, pin 8 to go high. When pin 8 of U6 goes high, pin 6 of U7, a DUAL PERIPHERAL DRIVER, also goes high causing pin 5 of U7 to go low, turning on LED1, the UP lamp in SW1 for the same period of time set by R1 and C1.

SW3A is the manual "up" toggle switch, and it controls the output at J1-1 in the following manner. When SW3A is actuated, the level at pin 5 of U5 goes from low to high due to R6, causing pin 6 of U5 to go low, locking out any action of SW2 by holding pin 9 of U4 low, and SW1, by holding pin 2 of U4 low. When pin 6 of U5 goes low, pin 1 of U1 also goes low triggering THY1 "on" through R9; and the voltage level at J1-1 goes from zero to 120 Volts AC for the time SW3A is actuated. When pin 6 of U5 goes low, pin 9 of U6 also goes low causing its output, pin 8 to go high. When pin 8 of U6 goes high, pin 6 of U7 also goes high, causing pin 5 of U7 to go low, turning to LED1, the UP lamp in SW1 for the same period of time SW3A is actuated.

Connector J2 pins 36 and 21 (J2-36 and J2-21) provide an external digital interface to the "up" circuit for open-collector output type logic devices, and they control the output at J1-1 in the following manner. When J2-36 is pulled low with respect to J2-21, pin 1 of U6 also goes low causing its output, pin 2, to go high. When pin 2 of U6 goes high, pin 3 of U5 also goes high causing pin 6 of U5 to go low, locking out any action of SW2 by holding pin 9 of U4 low, and SW1, by holding pin 2 of U4 low. When pin 6 of U5 goes low, pin 1 of U1 also goes low triggering THY1 "on" through R9; and the voltage level at J1-1 goes from zero to 120 Volts AC for the time J2-36 is held low. When pin 6 of U5 goes low, pin 9 of U6 also goes low causing its output, pin 8 to go high. When pin 8 of U6 goes high, pin 6 of J7 also goes high causing pin 5 of U7 to go low, turning on LED1, the UP lamp in Sw1, for the same period of time J2-36 is low.

THE DOWN SECTION

SW2 is the "down" pushbutton switch, and it controls the voltage level at connector J1 pins 2 and 3 (J1-2 and J1-31) in the following manner. When SW2 is actuated, the voltage at pin 12 of U4, a QUADRUPLE TWO INPUT AND GATE, changes from low (near zero volts) to high (near +5 volts) due to R8. As long as pin 13 of U4 is also high, which it will be if no other input is calling for an action from the DOWN section of U5, a TRIPLE THREE INPUT NOR GATE, a high level is also generated at pins 11 and 10 of U4. As long as pin 9 of U4 is also high, which it will be as long as there has been no level change at pins 3, 4 or 5 of U5 requesting an action from the UP circuit, a high level is also generated at pin 8 of U4 and pin 10 of U3. U3 is a DUAL NON-RETRIGGERABLE MONOSTABLE ONE SHOT device, configured with its "A2" input (pin 9) held low and its "CLEAR" input (pin 11) held high. In the quiescent state U's "Q2" output is low. A rising voltage level on its "B2" input (pin 10) will cause its "Q2" output (pin 5) to change state for the time period set by the values of R2 and C2. A maximum period of 70 seconds is allowed by this device. When pin 5 of U3 goes high, pin 1 of U5 also goes high causing pin 12 of U5 to go low, locking out any action of SW1 by holding pin 5 of U4 low. When pin 12 of U5 goes low, pin 1 of U2, a DC CONTROLLED SOLID STATE AC RELAY, also goes low, trigering TRIAC THY2 "on" through R10; and the voltage level at J1-2 goes from zero to ;b 120 Volts AC for the time period set by R2 and C2. When pin 12 of U5 goes low, pin 5 of U6, a HEX INVERTER BUFFER, also goes low causing its output, pin 6 to go high. When pin 6 of U6 goes high, pin 1 of U7, a DUAL PERIPHERAL DRIVER, also goes high causing pin 3 of U7 to go low, turning on LED2, the DOWN lamp in SW2 for the same period of time set by R2 and C2.

SW3B is the manual "down" toggle switch, and it controls the output at J1-2 in the following manner. When SW3B is actuated, the level at pin 2 of U5 goes from low to high due to R3, causing pin 12 of U5 to go low, locking out any action of SW1 by holding pin 5 of U4 low, and SW2, by holding pin 13 of U4 low. When pin 12 of U5 goes low, pin 1 of U2 also goes low triggering THY2 "on" through R10; and the voltage level at J1-2 goes from zero to 120 Volts AC for the time SW3B is actuated. When pin 12 of U5 goes low, pin 5 of U6 also goes low causing its output, pin 6 to go high. When pin 6 of U6 goes high, pin 1 of U7 also goes high causing pin 3 of U7 to go low, turning on LED2, the DOWN lamp in SW2 for the same period of time SW3B is actuated.

Connector J2 pins 37 and 21 (J2-37 and J2-21) provide an external digital interface to the "down" circuit for open-collector output type logic devices, and they control the output at J1-2 in the following manner. When J2-37 is pulled low with respect to J2-21, pin 3 of U6 also goes low causing its output, pin 4, to go high. When pin 4 of U6 goes high, pin 13 of U5 also goes high causing pin 12 of U5 to go low, locking out any action of SW1 by holding pin 5 of U4 low, and SW2, by holding pin 13 of U4 low. When pin 12 of U5 goes low, pin 1 of U2 also goes low triggering THY2 "on" through R10; and the voltage level at J1-2 goes from zero to 120 Volts AC for the time J2-37 is held low. When pin 12 of U5 goes low, pin 5 of U6 also goes low causing its output, pin 6, to go high. When pin 6 of U6 goes high, pin 1 of U7 also goes high causing pin 3 of U7 to go low, turning on LED2, the DOWN lamp in SW2, for the same period of time J2-37 is low.

The best method of accomplishing this circuit is with the list of parts below, constructed on a custom designed printed circuit board and housed in a metal enclosure to insure best noise immunity; with swiches, cables and connectors conveniently located on the surfaces of the enclosure.

| ITEM | DESCRIPTION | TYPE |
|---|---|---|
| R1,R2 | 100k ohm 15 turn trim pot | 3006P |
| R3 → R8 | 10k ohm ¼ watt resistor 10% | carbon |
| R9,R10 | 150 ohm ¼ watt resistor 10% | carbon |
| C1,C2 | 470 uf 15 WVDC pc mount | electrolytic |
| U1,U2 | Teledyne solid state relay | C76AO-1 |
| U3 | dual non-retriggerable ONE SHOT | 74LS221 |
| U4 | quad 2-input AND gate | 74LS08 |
| U5 | triple 3-input NOR gate | 74LS27 |
| U6 | hex inverter buffer | 74LS04 |
| U7 | dual peripheral driver | 75454 |
| THY1,THY2 | 400 volt 6 amp TRIAC | T2500D |
| SW1,SW2 | EAO form z mom. pushbutton | 31-121 |
| | EAO lens for above | 31-904-7 |
| LED1,LED2 | EAO light emitting diode | 31-967.0-4 |
| SW3 | Alcoswitch toggle (on)-on-(on) | MTA-206SA |
| PS-1 | Acopian P.S. 5 volt 250 ma. | 5E25 |
| J1 | Philmore 4 pin jack | P606CB |
| P1 | Philmore 4 pin plug | T609CB |
| J2 | Canon 37 pin connector | DC-37S |
| F1 | fuse sized to match load | 3AG TYPE |
| MISC. | wire, cable, lugs, chassis, etc. to mount above components. | |

The values listed above for R1,R2 and C1,C2 will yield a time period which is adjustable from a few milliseconds to over 30 seconds depending upon the tolerances of the components.

I claim:

1. A device for controlling the electric motor in a video projection screen to drive the screen both up and down to its full mechanical limits, which comprises an electronic circuit with:

first up/down drive initiation means including:

first switch means comprising a first pair of switches, one for up initiation kand one for down initiation, to provide a manual pulse when momentarily actuated;

first gate means comprising a first pair of gates, one for up control and one for down control, each gate having a first input and a second input and an output, said first input of said first up gate, being connected to said first up switch, said first input of said first down gate, being connected to said first down switch;

second gate means comprising a second pair of gates, one for up control and one for down control, each gate having a first input and a second input and an output, said first input of said second up gate, being connected to said output of said first up gate, said first input of said second down gate, being connected to said output of said first down gate, functioning along with first gate means to lock out initiation from first up switch means during down initiation and to lock out initiation from first down switch means during up initiation;

timer means comprising a pair of adjustable timers, one for up control and one for down control, each timer having an input and an output, said input of said up timer being connected to said output of said second up gate, said input of said down timer being connected to said output of said second down gate, functioning to provide an adjustable length pulse on its output when a pulse appears on its input;

third gate means comprising a third pair of gates, one for up control and one for down control, each gate having a first input and a second input and a third input and an output, said first input of said third up gate being connected to said up timer output, said first input of said third down gate being connected to said down timer output, functioning to allow drive initiation and input from several sources, also along with first and second gate means to lock out first up/down drive initiation means during all other drive initiation means;

second up/down drive initiation means including:

switch means comprising a switch, having a first pole and a second pole, one pole for up initiation and one pole for down initiation, each of said poles having a first throw and a second throw, said first pole being connected to said second input of said third up gate, said first throw of said first pole being connected to circuit common, said second pole being connected to said second input of said third down gate, said first throw of said second pole being connected to circuit common, functioning to provide a mutually exclusive manual signal to either the up or the down circuit for the duration of actuation;

digital interface for up/down drive initiation including:

first inverter means comprising a first pair of inverters, one for up control and one for down control, each inverter having an input and an output, said input of said first up inverter being connectable to an external signal capable of sinking the required current to change said first up inverter input to the low state, said output of said first up inverter being connected to said third input of said third up gate, said input of said first down inverter being connectable to an external signal capable of sinking the required current to change said first down inverter input to the low state, said output of said first down inverter being connected to said third input of said third down gate;

alternating current motor control means including:

alternating current trigger means comprising a pair of current triggers, one for up triggering and one for down triggering, having an input and an output, said input of said up alternating current trigger being connected to said output of said third up gate and said second input of said first up gate and said second input of said second down gate, said input of said down alternating current trigger being connected to said output of said third down gate and said second input of said first down gate and said second input of said second up gate;

alternating current switch means comprising a pair of current switches, one for up switching and one for down switching, having a gate input and an alternating current input and an alternating current output, said gate input of said up alternating current switch being connected to said up alternating current trigger output, said up alternating current switch input being connectable to an alternating current power line, said up alternating current output being connectable to an up winding on the motor of a video projection screen, said gate input of said down alternating current switch being connected to said down alternating current trigger output, said down alternating current switch input being connectable to an alternating current power line, said down alternating current switch output being connectable to a down winding on the motor of a video projection screen, functioning to apply an alternating current to either of the motor windings during the period that its associated gate input is triggered.

2. The electronic circuit of claim 1 and further including:

direction of travel indication means including:

an inverter means comprising a pair of inverters, one for up indication control and one for down indication control, each inverter having an input and an output said input of said up inverter being connected to said output of said third up gate and said second input of said first up gate and said second input of said second down gate, said input of said down inverter being connected to said output of said third down gate and said second input of said first down gate and said second input of said second up gate;

lamp driver means comprising a pair of drivers, one for up lamp drive and one for down lamp drive, each lamp driver having an input and an output, said input of said up lamp driver being connected to said output of said up inverter, said input of said down lamp driver being connected to said output of said down inverter, said output of said up lamp driver being connected to a lamp, said output of said down lamp being connected to a lamp, each lamp driver having a function such that applying a certain signal to its input will cause its output to apply power to light a lamp during that signal.

* * * * *